Aug. 25, 1931.  A. LUDWIG  1,820,081
PORTABLE POWER OPERATED HAMMER
Original Filed Nov. 25, 1929
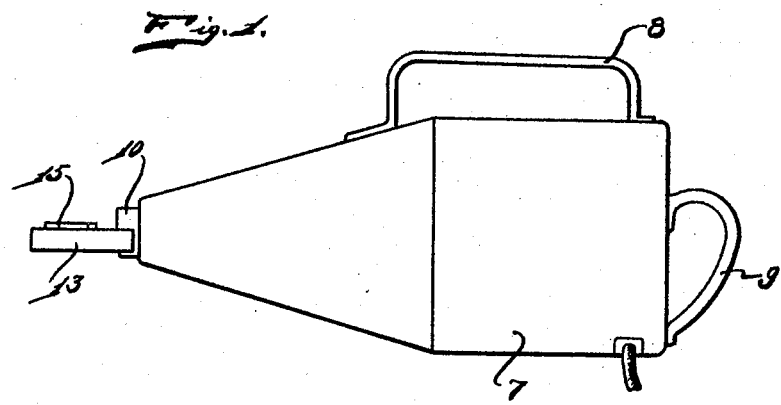
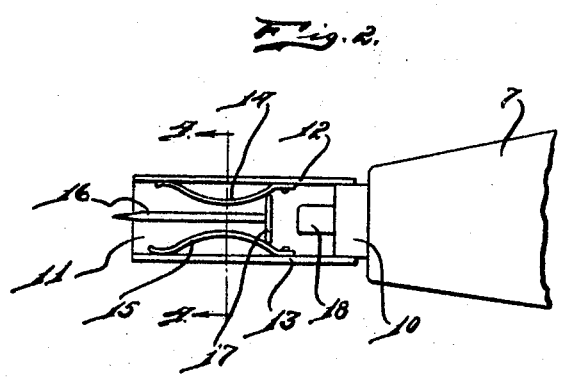
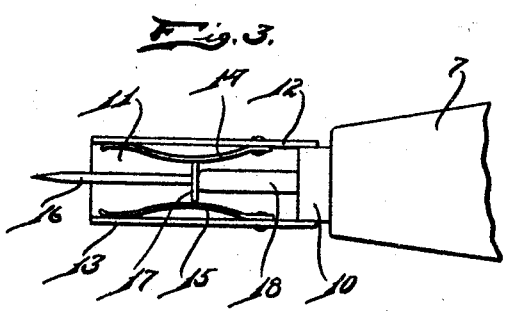
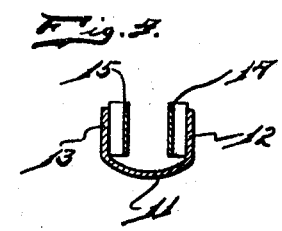
INVENTOR.
Abraham Ludwig
BY
ATTORNEY.

Patented Aug. 25, 1931

1,820,081

UNITED STATES PATENT OFFICE

ABRAHAM LUDWIG, OF DETROIT, MICHIGAN

PORTABLE POWER OPERATED HAMMER

Application filed November 25, 1929, Serial No. 409,742. Renewed May 27, 1931.

My invention relates to a new and useful improvement in a portable power operated hammer, and has for its object the provision of a hammer so arranged and constructed that it may be easily transported from place to place.

Another object of the invention is the provision in a power operated hammer of an easily attachable retaining member which will serve to support an object in position for being operated upon by the hammer.

Other objects will appear hereinafter.

The invention consists in the combination and arrangement of parts hereinafter described and claimed.

The invention will be best understood by a reference to the accompanying drawings which form a part of this specification and in which, Fig. 1 is a side elevational view of the invention.

Fig. 2 is a fragmentary top plan view of the invention.

Fig. 3 is a view similar to Fig. 2 showing the hammer mechanism in operative position.

Fig. 4 is a view taken on line 4—4 of Fig. 2.

In the drawings I have illustrated the invention applied to an electrically operated hammer mechanism enclosed in a casing 7 mounted on the upper side of which is an axially directed handle 8. A handle 9 is mounted on the rear wall of the casing.

Detachably mounted on a cylindrical projection 10 of the casing 7 is a U shaped retaining member 11 having the side walls 12 and 13 on which are mounted the bow shaped springs 14 and 15 which are spaced apart and serve as a retaining member for a nail 16, the head 17 being engaged by the springs 14 and 15 so that when the plunger 18 is retracted, the nail will be held in position.

The retainer 11 is slipped onto the portion 10 and retained thereon through a clamping engagement, the clamping being effected by the resiliency of the metal itself.

With a device of this kind, a simple and inexpensive method of enclosing a hammer mechanism is provided and a portable structure afforded.

While I have illustrated and described the preferred form of structure of my invention, I do not wish to limit myself to the precise details of construction shown but desire to avail myself of such variations and modifications as may come within the scope of the appended claims.

Having thus described my invention what I claim as new and desire to secure by Letters Patent is:

1. A portable power operated hammer, comprising: a casing; a projection extending outwardly from one end of said casing; a resilient retaining member engaging and clamping itself on said projection, said retaining member being substantially U shaped in cross section; and a pair of oppositely positioned bow shaped springs in said retaining member and in spaced relation to each other.

2. A power operated hammer of the class described, comprising: a casing; a projection extending outwardly from one end of said casing; a retaining member embracing said projection, said retaining member being elongated and substantially U shaped in cross section; a pair of bow shaped springs each fastened at one end and on the inner surface of one side of said retainer and being in spaced relation to each other.

In testimony whereof I have signed the foregoing specification.

ABRAHAM LUDWIG.